United States Patent
McKenney

(10) Patent No.: US 10,360,080 B2
(45) Date of Patent: *Jul. 23, 2019

(54) SHORT-CIRCUITING NORMAL GRACE-PERIOD COMPUTATIONS IN THE PRESENCE OF EXPEDITED GRACE PERIODS

(71) Applicant: International Business Machines Corporation, Armonk, NY (US)

(72) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 341 days.

This patent is subject to a terminal disclaimer.

(21) Appl. No.: 15/424,826

(22) Filed: Feb. 4, 2017

(65) Prior Publication Data

US 2018/0060086 A1    Mar. 1, 2018

Related U.S. Application Data

(63) Continuation of application No. 15/252,160, filed on Aug. 30, 2016.

(51) Int. Cl.
*G06F 9/52* (2006.01)
*G06F 9/4401* (2018.01)
*G06F 12/0813* (2016.01)

(52) U.S. Cl.
CPC ............ *G06F 9/526* (2013.01); *G06F 9/4418* (2013.01); *G06F 12/0813* (2013.01); *G06F 2212/60* (2013.01); *G06F 2212/62* (2013.01)

(58) Field of Classification Search
CPC .............................. G06F 9/526; G06F 9/4418
USPC ......................................................... 707/687
See application file for complete search history.

(56) References Cited

U.S. PATENT DOCUMENTS

| 5,442,758 | A | 8/1995 | Slingwine et al. |
|---|---|---|---|
| 5,608,893 | A | 4/1997 | Slingwine et al. |
| 5,727,209 | A | 3/1998 | Slingwine et al. |
| 6,219,690 | B1 | 4/2001 | Slingwine et al. |
| 6,662,184 | B1 | 12/2003 | Friedberg |
| 6,886,162 | B1 | 4/2005 | McKenney |
| 6,996,812 | B2 | 2/2006 | McKenney |

(Continued)

OTHER PUBLICATIONS

P. McKenney et al., "Read-Copy Update: Using Execution History to Solve Concurrency Problems," PDCS, Oct. 1998, 11 pages.

(Continued)

*Primary Examiner* — Hicham Skhoun
(74) *Attorney, Agent, or Firm* — Walter W. Duft

(57) ABSTRACT

A technique for short-circuiting normal read-copy update (RCU) grace period computations in the presence of expedited RCU grace periods. The technique may include determining during normal RCU grace period processing whether at least one expedited RCU grace period elapsed during a normal RCU grace period. If so, the normal RCU grace period is ended. If not, the normal RCU grace period processing is continued. Expedited RCU grace periods may be implemented by expedited RCU grace period processing that periodically awakens a kernel thread that implements the normal RCU grace period processing. The expedited RCU grace period processing may conditionally throttle wakeups to the kernel thread based on CPU utilization.

7 Claims, 8 Drawing Sheets

(56) References Cited

U.S. PATENT DOCUMENTS

| | | | |
|---|---|---|---|
| 7,191,272 | B2 | 3/2007 | McKenney |
| 7,287,135 | B2 | 10/2007 | McKenney et al. |
| 7,353,346 | B2 | 4/2008 | McKenney et al. |
| 7,349,879 | B2 | 6/2008 | McKenney et al. |
| 7,395,263 | B2 | 7/2008 | McKenney |
| 7,395,383 | B2 | 7/2008 | McKenney |
| 7,426,511 | B2 | 9/2008 | McKenney |
| 7,454,581 | B2 | 11/2008 | McKenney et al. |
| 7,472,228 | B2 | 12/2008 | McKenney et al. |
| 7,653,791 | B2 | 1/2010 | McKenney |
| 7,689,789 | B2 | 3/2010 | McKenney et al. |
| 7,734,879 | B2 | 6/2010 | McKenney et al. |
| 7,734,881 | B2 | 6/2010 | McKenney et al. |
| 7,747,805 | B2 | 6/2010 | McKenney |
| 7,814,082 | B2 | 10/2010 | McKenney |
| 7,818,306 | B2 | 10/2010 | McKenney et al. |
| 7,904,436 | B2 | 3/2011 | McKenney |
| 7,953,708 | B2 | 5/2011 | McKenney et al. |
| 7,953,778 | B2 | 5/2011 | McKenney et al. |
| 8,020,160 | B2 | 9/2011 | McKenney |
| 8,055,860 | B2 | 11/2011 | McKenney et al. |
| 8,055,918 | B2 | 11/2011 | McKenney et al. |
| 8,108,696 | B2 | 1/2012 | Triplett |
| 8,126,843 | B2 | 2/2012 | McKenney et al. |
| 8,176,489 | B2 | 5/2012 | Bauer et al. |
| 8,185,704 | B2 | 5/2012 | McKenney et al. |
| 8,195,893 | B2 | 6/2012 | Triplett |
| 8,407,503 | B2 | 3/2013 | McKenney |
| 8,495,641 | B2 | 7/2013 | McKenney |
| 8,615,771 | B2 | 12/2013 | McKenney |
| 8,706,706 | B2 | 4/2014 | McKenney |
| 8,874,535 | B2 | 10/2014 | McKenney |
| 8,924,655 | B2 | 12/2014 | McKenney |
| 8,938,631 | B2 | 1/2015 | McKenney |
| 8,972,801 | B2 | 3/2015 | McKenney |
| 9,003,420 | B2 | 4/2015 | McKenney |
| 9,189,413 | B2 | 11/2015 | McKenney |
| 9,250,978 | B2 | 2/2016 | McKenney |
| 9,256,476 | B2 | 2/2016 | McKenney |
| 9,348,765 | B2 | 5/2016 | McKenney |
| 9,396,226 | B2 | 6/2016 | McKenney |
| 9,389,925 | B2 | 7/2016 | McKenney |
| 2008/0082532 | A1 | 4/2008 | McKenney |
| 2012/0324473 | A1* | 12/2012 | McKenney ............ G06F 9/526 718/107 |
| 2013/0061071 | A1* | 3/2013 | McKenney ........... G06F 1/3206 713/320 |
| 2014/0281295 | A1* | 9/2014 | McKenney ........... G06F 12/121 711/159 |
| 2014/0380084 | A1 | 12/2014 | McKenney |
| 2015/0153817 | A1* | 6/2015 | McKenney ........... G06F 9/5094 713/323 |

OTHER PUBLICATIONS

P. McKenney et al., "Read-Copy Update," 2001 Ottawa Linux symposium, Jul. 2001, 22 pages.
H. Lindar et al., "Scalability of the Directory Entry Cache," 2002 Ottawa Linux Symposium, Jun. 26, 2002, pp. 289-300.
P. McKenney et al.,"Read-Copy Update," 2002 Ottawa Linux Symposium, Jul. 8, 2002, 32 pages.
A. Arcangeli et al., "Using Read-Copy-Update Techniques for System V IPC in the Linux 2.5 Kernel," 2003 FREENIX, Jun. 14, 2003, 13 pages.
P. McKenney et al., "Using RCU in the Linux 2.5 Kernel," Linux Journal, Oct. 1, 2003, 11 pages.
P. McKenney et al., "Scaling dcache with RCU," Linux Journal, Jan. 1, 2004, 12 pages.
P. McKenney, "RCU vs. Locking Performance on Different CPUs," 2004 Linux.conf.au, 2004, 18 pages.
P. Zijlstra, "[PATCH] slab: document SLAB_DESTROY_BY_RCU", LKML.org, Nov. 13, 2008, 1 page.
D. Sarma et al., "Making RCU Safe for Deep Sub-Millisecond Response Realtime Applications," 2004 USENIX (UseLinux track) Jun. 2004, 9 pages.
P. McKenney et al., "Extending RCU for Realtime and Embedded Workloads," 2006 Ottawa Linux Symposium, Aug. 11, 2006, 15 pages.
P. McKenney, "Sleepable RCU", LWN.net, Sep. 6, 2010, 10 pages.
T. Gleixner, High Resolution Timers / Dynamic Tics—V2, LWN.net, Oct. 31, 2006, 5 pages.
P. McKenney, "RCU and Unloadable Modules", LWN.net, Jan. 14, 2007, 4 pages.
P. McKenney, "Using Promela and Spin to verify parallel algorithms", LWM.net, Aug. 1, 2007, 11 pages.
P. McKenney, "The design of preemptible read-copy-update," LWN.net, Oct. 8, 2007, 27 pages.
T. Hart et al., "Performance of memory reclamation for lockless synchronization", Journal of Parallel and Distributed Computing, Dec. 2007, pp. 1270-1285.
P. McKenney, "What is RCU, Fundamentally", LWN.net, Dec. 17, 2007, 15 pages.
P. McKenney, What is Rcu? Part 2: Usage, LWN.net,Dec. 24, 2007, 15 pages.
P. McKenney, RCU part 3: the RCU API, LWN.net, Jan. 7, 2008, 7 pages.
P. McKenney, "Integrating and Validating dynticks and Preemptible RCU," LWN.net, Apr. 22, 2008, 19 pages.
D. Guniguntala et al., "The read-copy-update mechanism for supporting real-time applications on shared-memory multiprocessor systems with Linux", IBM Systems Journal vol. 47 No. 2, 2008, pp. 221-236.
P. McKenney, "Introducing Technology Into Linux", 2008 Linux Developer Symposium, China, 2008, 47 pages.
P. McKenney, "Hierarchical RCU," LWN.net, Nov. 4, 2008, 19 pages.
P. McKenney, "Using a Malicious User-Level RCU to Torture RCU-Based Algorithms", linux.conf.au, Jan. 2009, 51 pages.
M. Desnoyers, "Low-Impact Operating System Tracing", University of Montreal, PhD Thesis, Dec. 2009, 233 pages.
P. McKenney, "RCU: The Bloatwatch Edition", LWN.net, Mar. 17, 2009, 9 pages.
P. McKenney, "Expedited "big hammer" RCU grace periods", LKML.org, Jun. 25, 2009, 2 pages.
P. McKenney, "RCU cleanups and simplified preemptable RCU", LKML.org, Jul. 23, 2009, 1 page.
P. McKenney, "Deterministic Synchronization in Multicore Systems: the Role of RCU", Aug. 18, 2009, pp. 1-9.
P. McKenney, "Simplicity Through Optimization", linux.conf.au, Jan. 2010, 109 pages.
P. McKenney, "The RCU API, 2010 Edition", LWN.net, Dec. 8, 2010, 11 pages.
J. Triplett et al., "Resizable, Scalable, Concurrent Hash Tables via Relativistic Programming", ACM-SIGOPS Operating System Review vol. 44, Issue 3, Jul. 2010, 14 pages.
M. Desnoyers et al., "User-Level Implementations of Read-Copy Update", IEEE Transactions on Parallel and Distributed Systems, vol. x, No. y, Jul. 2009, pp. 1-14.
P. McKenney, "Making RCU Safe for Battery-Powered Devices", Embedded Linux Conference, Feb. 15, 2012, pp. 1-66.
P. McKenney, "Real-Time Response on Multicore Systems: It Is Bigger Than You Think", OSPERT '12 Workshop, Jul. 10, 2012, pp. 1-34.
P. McKenney, "Getting RCU Further Out of the Way", 2012 Linux Plumbers Conference, Real Time Microconference, Aug. 31, 2012, 31 pages.
P. McKenney, "The new visibility of RCU processing", LWN.net, Oct. 10, 2012, 4 pages.
P. McKenney, "CPU, Hotplug, RCU, and big.LITTLE", Linaro Connect, Nov. 1, 2012, 33 pages.
P. McKenney, Bare-Metal Multicore Performance in a General-Purpose Operating System, Multicore World, Feb. 2013, 66 pages.
P. McKenney, "Simplifying RCU", LWN.net, Mar. 6, 2013.
P. McKENNEY, "User-space RCU", LWN.net, Nov. 13, 2013, 15 pages.

(56) References Cited

OTHER PUBLICATIONS

J. Corbet, "The RCU-tasks subsystem", LWN.net, Jul. 30, 2014.
P. McKenney, "The RCU API, 2014 Edition", LWN.net, Sep. 4, 2014.
Ip.com et al.; "Throttling RCU updates to conserve memory", IPCOM000224867D, Jan. 8, 2013, 4 pages.
Ip.com et al.; "Expedited RCU Grace Periods With Improved Energy Efficiency", IPCOM000242015D, Jun. 15, 2015, 2 pages.
P. McKenney, "[Patch RFC tip/core/rcu 0/5] Expedited grace periods encouraging normal ones", LKML.org, Jun. 30, 2015, 1 page.
International Business Machines Corporation, "List of IBM Patents or Patent Applications Treated as Related", Feb. 4, 2017, 2 pages.

* cited by examiner

SHORT-CIRCUITING NORMAL GRACE-PERIOD COMPUTATIONS IN THE PRESENCE OF EXPEDITED GRACE PERIODS

BACKGROUND

1. Field

The present disclosure relates to computer systems and methods in which data resources are shared among data consumers while preserving data integrity and consistency relative to each consumer. More particularly, the disclosure concerns a mutual exclusion mechanism known as "read-copy update."

2. Description of the Prior Art

By way of background, read-copy update (also known as "RCU") is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to both uniprocessor and multiprocessor computing environments wherein the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory, and such operation may thus be referred to as a reclaimer. In certain RCU implementations, the second-phase update operation may comprise something else, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables. Moreover, the list itself is a type of data structure.

It is assumed that the data element list of FIGS. 1A-1D is traversed (without locking) by multiple readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock (to exclude other updaters), allocating new memory for B', copying the contents of B to B', modifying B' as needed, updating the pointer from A to B so that it points to B', and releasing the lock. In current versions of the Linux® kernel, pointer updates performed by updaters can be implemented using the rcu_assign_pointer( ) primitive. As an alternative to locking during the update operation, other techniques such as non-blocking synchronization or a designated update thread could be used to serialize data updates. All subsequent (post update) readers that traverse the linked list, such as the reader r2, will see the effect of the update operation by encountering B' as they dereference B's pointer. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays. In current versions of the Linux® kernel, pointer dereferences performed by readers can be implemented using the rcu_dereference( ) primitive.

At some subsequent time following the update, r1 will have continued its traversal of the linked list and moved its reference off of B. In addition, there will be a time at which no other reader task is entitled to access B. It is at this point, representing an expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following the expiration of a grace period.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state. For RCU implementations embodied in operating system kernels, a context switch, an idle loop, and user mode execution may be treated as implicit quiescent states. More generally, a quiescent state may be delineated by a kernel code path being outside an RCU read-side critical section. RCU read-side primitives such as rcu_read_lock( ) and rcu_read_unlock( ) are commonly used by the readers to denote the beginning and end of such critical sections.

In FIG. 3, four tasks 0, 1, 2, and 3 running on four separate CPUs are shown to pass periodically through quiescent states (represented by the vertical bars). The grace period (shown by the dotted vertical lines) encompasses the time frame in which all four tasks that began before the start of the grace period have passed through one quiescent state. If the four tasks 0, 1, 2, and 3 were reader tasks traversing the linked lists of FIGS. 1A-1D or FIGS. 2A-2C, none of these tasks having reference to the old data element B prior to the grace period could maintain a reference thereto following the grace period. All post grace period searches conducted by these tasks would bypass B by following the updated pointers created by the updater.

In some RCU implementations, such as current versions of the Linux® kernel, there are expedited and normal RCU grace periods. A normal RCU grace period may be initiated by way of a call to the synchronize_rcu( ) or synchronize_sched( ) primitives whereas a call to the synchronize_rcu_expedited( ) or synchronize_sched_expedited( ) primitives initiates an expedited RCU grace period. Expedited RCU grace periods can be orders of magnitude faster than normal RCU grace periods and are thus useful for latency-sensitive operations.

Expedited and normal RCU grace periods currently run completely separately from each other in the Linux® kernel. However, if an expedited RCU grace period executes after a normal RCU grace period starts, the normal RCU grace period could end as soon as the expedited RCU grace period ends insofar as the latter guarantees that all CPUs of interest will have passed through a quiescent state. Given current implementations, the normal RCU grace period will instead continue executing, needlessly consuming CPU time and needlessly increasing grace-period latency.

Applicant submit that it would be beneficial if a normal RCU grace period could take advantage of the work done by an expedited RCU grace period.

SUMMARY

A method, system and computer program product are provided for short-circuiting normal read-copy update (RCU) grace period computations in the presence of expedited RCU grace periods. The disclosed technique may include determining during normal RCU grace period processing whether at least one expedited RCU grace period elapsed during a normal RCU grace period. If so, the normal RCU grace period is ended. If not, the normal RCU grace period processing is continued. Expedited RCU grace periods may be implemented by expedited RCU grace period processing that periodically awakens a kernel thread that implements the normal RCU grace period processing. The expedited RCU grace period processing may conditionally throttle wakeups to the kernel thread based on CPU utilization.

BRIEF DESCRIPTION OF THE DRAWINGS

The foregoing and other features and advantages will be apparent from the following more particular description of example embodiments, as illustrated in the accompanying Drawings.

DETAILED DESCRIPTION OF EXAMPLE EMBODIMENTS

Figure 1A:
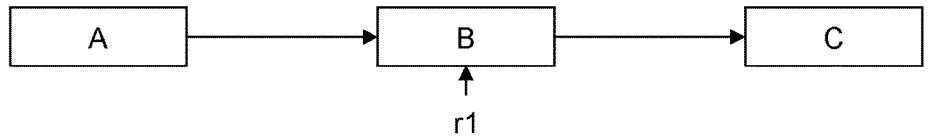
FIGS. 1A-1D are diagrammatic representations of a linked list of data elements undergoing a data element replacement according to a conventional read-copy update mechanism.
Figure 1B:
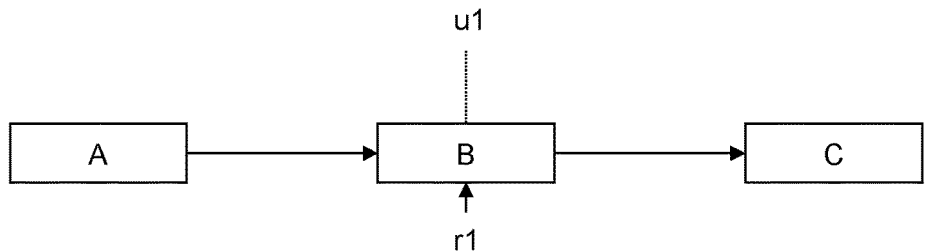
Figure 1C:
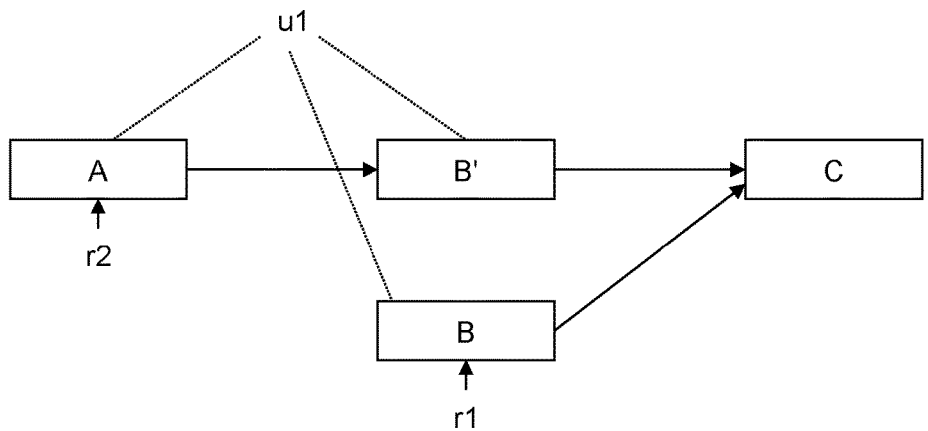
Figure 1D:
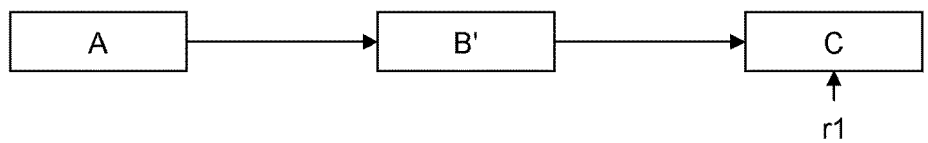
Figure 2A:
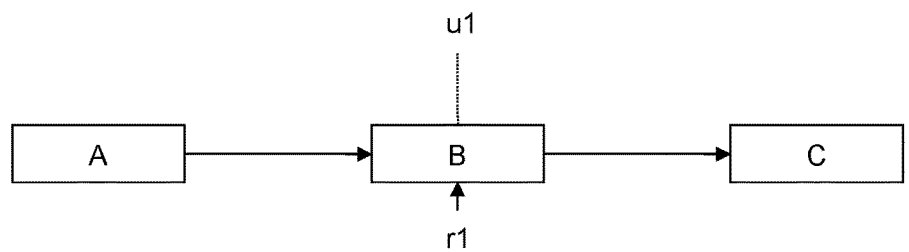
FIGS. 2A-2C are diagrammatic representations of a linked list of data elements undergoing a data element deletion according to a conventional read-copy update mechanism.
Figure 2B:
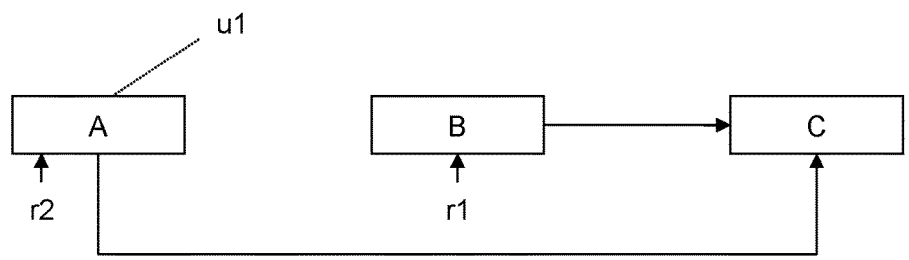
Figure 2C:
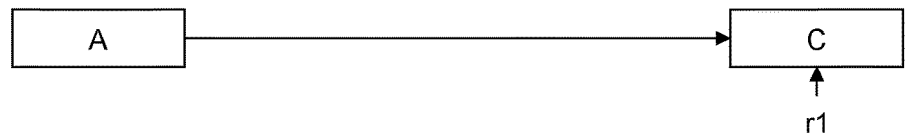
Figure 3:
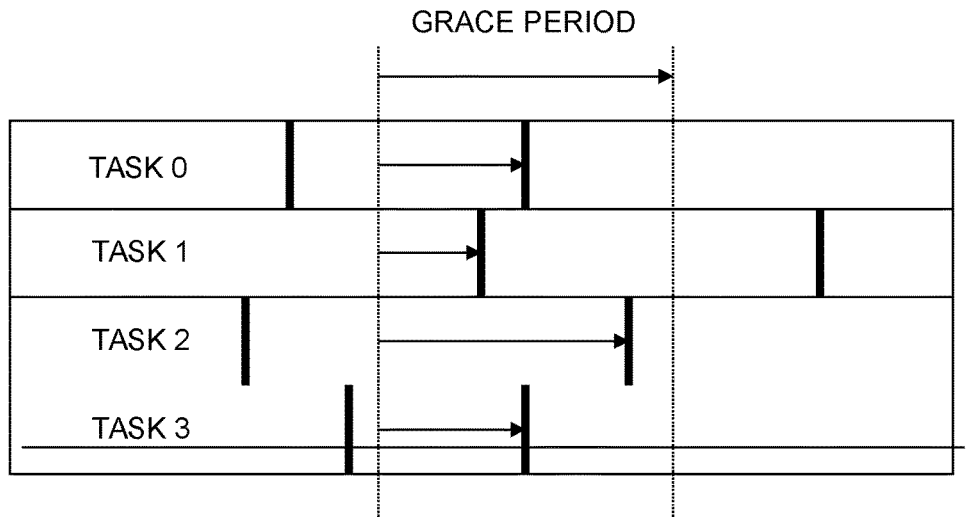
FIG. 3 is a flow diagram illustrating an example prior art grace period in which four processes pass through a quiescent state.
Figure 4:
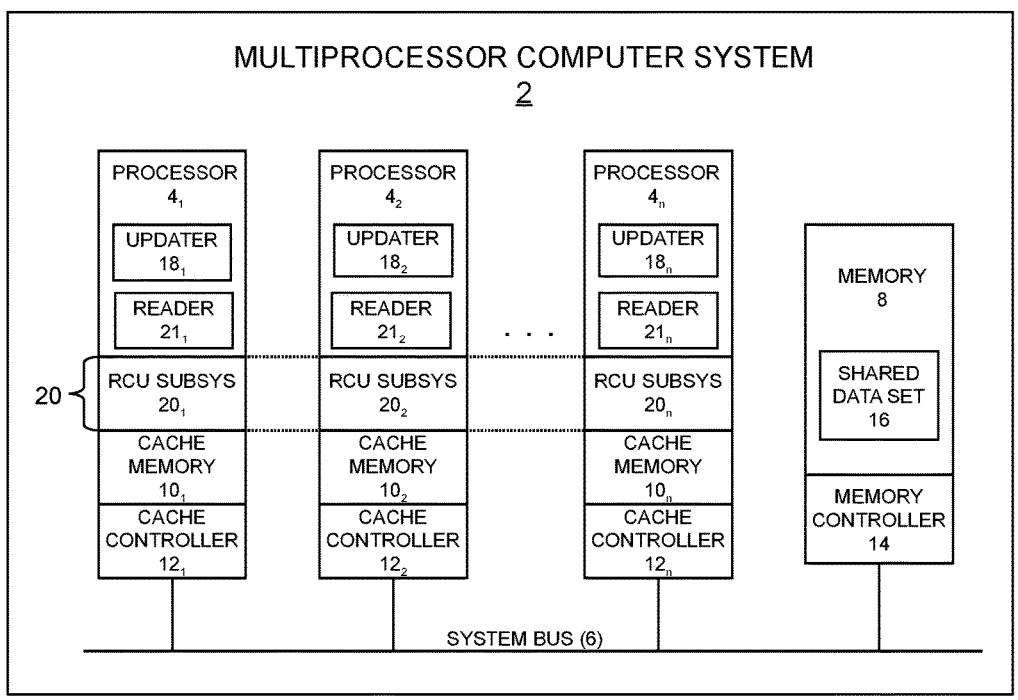
FIG. 4 is a functional block diagram showing a multiprocessor computing system.

Turning now to the figures, wherein like reference numerals represent like elements in all of the several views, FIG. 4 illustrates an example multiprocessor computer system 2 in which a technique for short-circuiting normal RCU grace period computations in the presence of expedited RCU grace periods may be implemented. In FIG. 4, the computer system 2 may include a plurality of processors $4_1, 4_2 \ldots 4_n$, a system bus 6, and a program memory 8. There may also be cache memories $10_1, 10_2 \ldots 10_n$ and cache controllers $12_1, 12_2 \ldots 12_n$ respectively associated with the processors $4_1, 4_2 \ldots 4_n$. A memory controller 14 may be associated with the memory 8. As shown, the memory controller 14 may reside separately from processors $4_2 \ldots 4_n$ (e.g., as part of a chipset). As discussed below, it could also comprise plural memory controller instances residing on the processors $4_1, 4_2 \ldots 4_n$.

The computer system 2 may represent any of several different types of computing apparatus. Such computing apparatus may include, but are not limited to, general purpose computers, special purpose computers, portable computing devices, communication and/or media player devices, set-top devices, embedded systems, and other types of information handling machines. The term "processor" as used with reference to the processors $4_1, 4_2 \ldots 4_n$ encompasses any program execution unit capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). Each such execution unit may also be referred to as a CPU (central processing unit). The processors $4_1, 4_2 \ldots 4_n$ may be situated within a single computing device or node (e.g., as part of a single-node SMP system) or they may be distributed over plural nodes (e.g., as part of a NUMA system, a cluster, or a cloud). The memory 8 may comprise any type of tangible storage medium capable of storing data in computer readable form for use in program execution, including but not limited to, any of various types of random access memory (RAM), various flavors of programmable read-only memory (PROM) (such as flash memory), and other types of primary storage (i.e., program memory). The cache memories $10_1$, $10_2 \ldots 10_n$ may be implemented in several levels (e.g., as level 1, level 2 and level 3 caches) and the cache controllers $12_1$, $12_2 \ldots 12_n$ may collectively represent the cache controller logic that supports each cache level. As illustrated, the memory controller 14 may reside separately from processors $4_1$, $4_2 \ldots 4_n$, for example, as part of a discrete chipset. Alternatively, as previously mentioned, the memory controller 14 could be provided by plural memory controller instances that are respectively integrated with the processors $4_1$, $4_2 \ldots 4_n$.

Each CPU embodied by a given processor 4 is operable to execute program instruction logic under the control of a software program stored in the memory 8 (or elsewhere). As part of this program execution logic, update operations (updaters) 18 may execute within a process, thread, or other execution context (hereinafter "task") on any of the processors 4. Each updater 18 may run from program instructions stored in the memory 8 (or elsewhere) in order to periodically perform updates on a set of shared data 16 that may be stored in the shared memory 8 (or elsewhere). In FIG. 4, reference numerals $18_1$, $18_2 \ldots 18_n$ illustrate individual data updaters that respectively execute on the several processors $4_1$, $4_2 \ldots 4_n$. As described in the "Background" section above, the updates performed by an RCU updater can include modifying elements of a linked list, inserting new elements into the list, deleting elements from the list, and other types of operations. To facilitate such updates, the processors 4 may be programmed from instructions stored in the memory 8 (or elsewhere) to implement a read-copy update (RCU) subsystem 20 as part of their processor functions. In FIG. 4, reference numbers $20_1$, $20_2 \ldots 20_n$ represent individual RCU instances that may respectively periodically execute on the several processors $4_1$, $4_2 \ldots 4_n$. Operational details of the RCU subsystem 20 are described below.

Any given processor 4 may also periodically execute a read operation (reader) 21. Each reader 21 runs from program instructions stored in the memory 8 (or elsewhere) in order to periodically perform read operations on the set of shared data 16 stored in the shared memory 8 (or elsewhere). In FIG. 4, reference numerals $21_1$, $21_2 \ldots 21_n$ illustrate individual reader instances that may respectively execute on the several processors $4_1$, $4_2 \ldots 4_n$. Such read operations will typically be performed far more often than updates, this being one of the premises underlying the use of read-copy update. Moreover, it is possible for several of the readers 21 to maintain simultaneous references to one of the shared data elements 16 while an updater 18 updates the same data element.

In an example embodiment, the readers 21 may be preempted while executing within their RCU read-side critical sections. This would be the case, for example, if the readers 21 embody kernel code paths in a preemptible operating system kernel. To accommodate such reader preemption, the RCU subsystem 20 may be configured as a preemptible RCU implementation.

During operation of the computer system 2, an updater 18 may occasionally perform an update to one of the shared data elements 16. In accordance with the philosophy of RCU, a first-phase update may be performed in a manner that temporarily preserves a pre-update view of the shared data element for the benefit of readers 21 that may be concurrently referencing the shared data element during the update operation. Following the first-phase update, the updater 18 may call an RCU primitive such as synchronize_rcu( ) or synchronize_sched( ) to invoke the RCU subsystem 20 to track a normal RCU grace period for deferred destruction of the pre-update view of the data (second-phase update). The normal grace period processing performed by the RCU subsystem 20 may entail starting new grace periods and detecting the end of old grace periods so that the RCU subsystem 20 knows when it is safe to free stale data (or take other actions).

Figure 5:
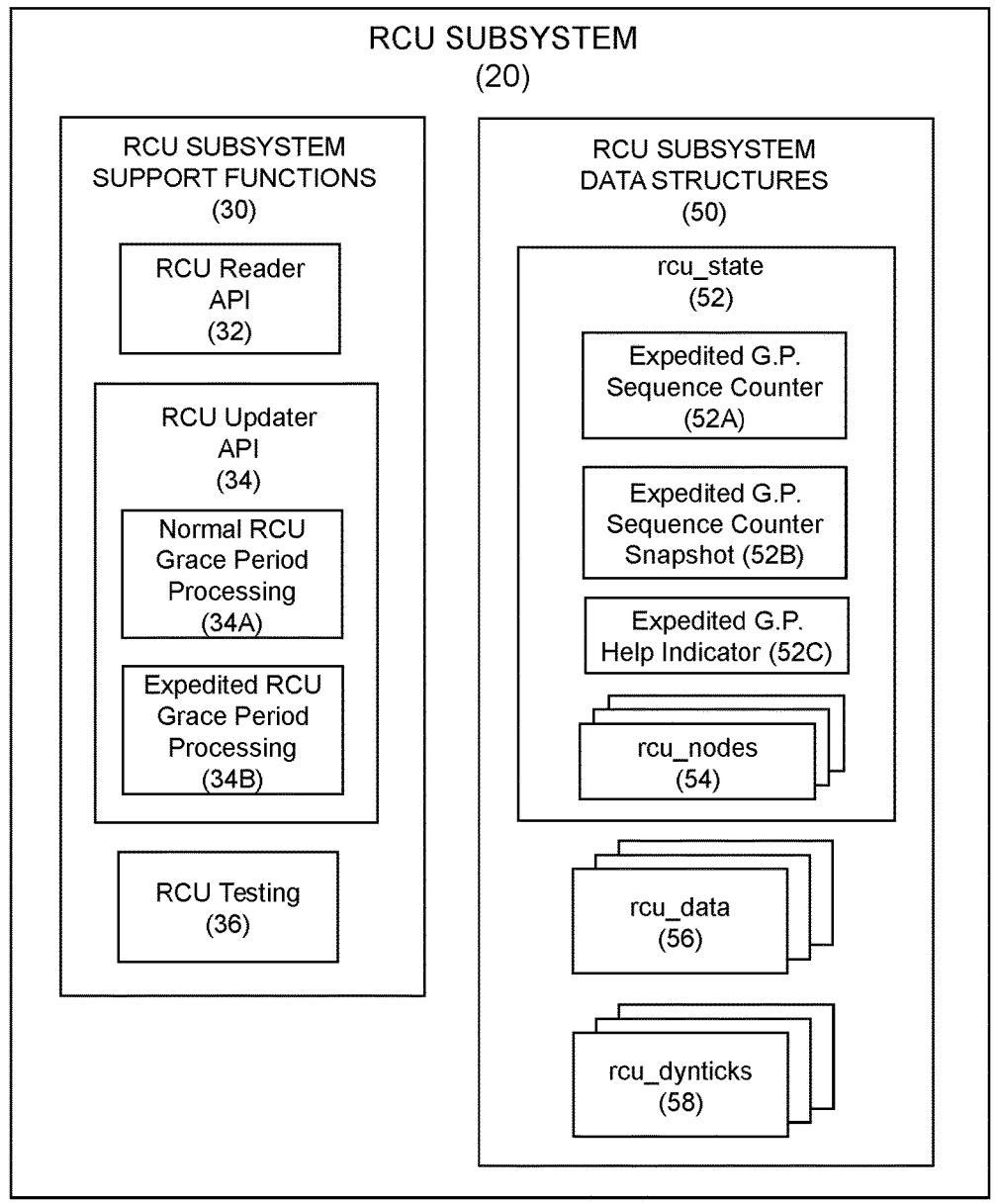
FIG. 5 is a functional block diagram showing an example RCU subsystem.

Turning now to FIG. 5, example components of the RCU subsystem 20 are shown. Among these components is a set of RCU subsystem support functions 30, namely, an RCU reader API (Application Programming Interface) 32, an RCU updater API 34, and a set of RCU test functions 36.

The RCU reader API 32 may comprise a reader registration component and a reader unregistration component that are respectively invoked by readers 21 as they enter and leave their RCU read-side critical sections to read shared data 16. This allows the RCU subsystem 20 to track reader operations and determine when readers are engaged in RCU-protected read-side critical section processing. In an example embodiment, the reader registration and unregistration components may be respectively implemented using the rcu_read_lock( ) and rcu_read_unlock( ) primitives found in existing read-copy update implementations.

The RCU updater API 34 may comprise a normal RCU grace period processing component 34A and an expedited RCU grace period processing component 34B. The normal RCU grace period component 34A may include synchronization primitives such as synchronize_rcu( ) or synchronize_sched( ) for use by updaters 18 to defer the removal of shared data 16 that may be referenced by the readers 21 until a normal RCU grace period has elapsed. These functions, which may be implemented in the context of a kernel thread (e.g. a Linux® kthread), perform normal RCU grace period processing that may include starting new normal RCU grace periods and detecting the end of old normal RCU grace periods by waiting for CPUs in the computer system 2 to pass through quiescent states.

The expedited RCU grace period component 34B may include synchronization primitives such as synchronize_rcu_expedited( ) or synchronize_sched_expedited( ) for use by updaters 18 to defer the removal of shared data 16 that may be referenced by the readers 21 until an expedited RCU grace period has elapsed. These functions, which may be implemented in the context of a kernel thread (e.g. a Linux® kthread) that differs from that used for normal RCU grace period processing, perform expedited RCU grace processing that may include starting new expedited RCU grace periods and detecting the end of old expedited RCU grace periods by actively initiating quiescent states on the CPUs in the computer system 2. In an example embodiment, this may be done by sending an interprocessor interrupt (IPI) to all non-idle non-nohz (tickless) online CPUs. The IPI handler may check whether the CPU is in an RCU read-side critical section, and if so, it may set a flag in the CPU's rcu_data structure that causes the outermost rcu_read_unlock operation (in a set of nested invocations of this read-side RCU primitive) to report the quiescent state. On the other hand, if the CPU is not in an RCU read-side critical section, the IPI handler may report the quiescent state immediately. In a typical RCU implementation, an expedited RCU grace period may be an order of magnitude faster than an normal RCU grace period.

The RCU testing functions 40 are used to debug the RCU subsystem 20. In current versions of the Linux® kernel, this is referred to as the "rcutorture" test suite. The CONFIG_RCU_TORTURE_TEST compiler configuration option is available for all of Linux® kernel RCU implementations. This option creates an rcutorture kernel module that can be loaded to run an RCU torture test. The test periodically outputs status messages via printk( ), which can be examined via the "dmesg" command. The test is started when the module is loaded, and stops when the module is unloaded.

With continuing reference now to FIG. 5, the RCU subsystem 20 may further include a set of RCU subsystem data structures 50. These data structures include an rcu_state structure 52 having embedded therein (e.g., as a linear array) a combining tree of rcu_node structures 54. The RCU subsystem 20 thus supports hierarchical grace period detection, and may be characterized as a hierarchical RCU implementation. The tree of rcu_node structures tracks information needed to determine when RCU grace periods have elapsed. Such tracked information may include, within each rcu_node structure 54, a bitmask that identifies CPUs that have passed through a quiescent state and a list of blocked readers 21 that have been preempted within an RCU read-side critical section. Each leaf rcu_node structure 54 may additionally have a set of a per-processor rcu_data structures 56 assigned to it. Each rcu_data structure 56 represents one CPU in the computer system 2 and can be used to maintain rcu-related information specific to that CPU, such as RCU callback lists, quiescent-state and grace-period handling information, and other data. A set of per-CPU rcu_dynticks structures 58 may also be provided. Each of these structures maintains a counter that indicates whether or not a given CPU is in dynticks-idle mode.

As discussed in the "Background" section above, expedited and normal RCU grace periods currently run completely separately from each other in current versions of the Linux® kernel. However, if an expedited RCU grace period executes after a normal RCU grace period starts, the normal RCU grace period could end as soon as the expedited RCU grace period ends insofar as the latter guarantees that all CPUs of interest will have passed through a quiescent state. Given current implementations, the normal RCU grace period will instead continue executing, needlessly consuming CPU time and needlessly increasing grace-period latency.

A solution to this problem is to have the normal RCU grace period processing component 34A short-circuit normal RCU grace period computations in the presence of expedited RCU grace periods. This may be done by configuring the normal RCU grace period processing component 34A so that it periodically determines during normal RCU grace period processing whether at least one expedited grace period has elapsed during a normal RCU grace period. If so, the normal RCU grace period is ended. If not, normal RCU grace period processing is continued.

In an embodiment, the determining operation may be performed by the normal RCU grace period processing component 34A following its initialization of a normal RCU grace period and during a portion of the normal RCU grace period processing that implements iterative force-quiescent-state processing to force RCU quiescent states on a set of CPUs. This makes the proposed solution compatible with existing implementations of normal RCU grace period processing, which occurs in three distinct phases, as follows:

1. Grace-period initialization, implemented by the rcu_gp_init( ) function in current versions of the Linux® kernel.
2. Some number of force-quiescent-state passes, implemented by the rcu_gp_fqs( ) function in current versions of the Linux® kernel and including, among other things, checking for idle CPUs and reporting of quiescent states on these CPUs' behalf.
3. Grace-period cleanup, implemented by the rcu_gp_cleanup( ) function in current versions of the Linux® kernel.

In an embodiment, the normal RCU grace period processing component 34A implements these three phases. The determining operation may include detecting an initial expedited RCU grace period state following the grace period initialization phase. The remainder of the determining operation may be performed during the iterative force-quiescent-state processing phase. During each force-quiescent-state pass, a current expedited RCU grace period state may be detected that is subsequent to the initial expedited RCU grace period state. This subsequent expedited RCU grace period state may be compared to the initial expedited RCU grace period state to determine whether at least one expedited RCU grace period has elapsed since the initial expedited RCU grace period state.

In an embodiment, the initial expedited RCU grace period state and the subsequent expedited RCU grace period state may be determined by the normal RCU grace period processing component 34A from an expedited RCU grace period counter that counts elapsed expedited RCU grace periods. The initial expedited RCU grace period state may be indicated by an initial count value of the counter and the subsequent expedited RCU grace period state may be indicated by a subsequent count value of the counter. The counter may be a sequence counter that is incremented at the beginning and end of each expedited RCU grace period by the expedited RCU grace period processing component 34B. Advantageously, such a sequence counter is provided by RCU implementations in current versions of the Linux® kernel.

Specifically, existing expedited RCU grace period processing uses a sequence-counter scheme to allow multiple concurrent requests for an expedited RCU grace period to be satisfied by a single expedited RCU grace-period computation. This sequence-counter scheme in some ways resembles that of a sequence lock in that a counter is incremented at the beginning and at the end of a given expedited RCU grace-period computation. If the sequence counter has an odd value, an expedited RCU grace-period computation is in progress. If the sequence counter has an even value, the expedited RCU grace-period component 34B either is idle or is transitioning between a pair of consecutive expedited RCU grace-period computations. If the sequence counter has a value s at a given time, then once the sequence counter reaches the value $((s+3)\ \&\ \sim 0x1)$, a full expedited RCU grace period computation is guaranteed to have elapsed. It will be appreciated that the foregoing expression will produce a final value of s+2 whenever the s+3 sum is an odd number, and will produce a final value of s+3 whenever the s+3 sum is an even number. Readers that begin their RCU read-side critical sections while s is an odd value (i.e., an expedited RCU grace period is underway) will be protected by having their data preserved until at least s+3, which represents the end of the next expedited RCU grace period following the current one. Readers 21 that began their RCU read-side critical sections while s is an even value (i.e., an expedited RCU grace period is not underway) will be protected by having their data preserved until at least the end of the next expedited RCU grace period to begin. This will be when the sequence counter reaches s+2.

Any given expedited RCU grace period request may take a snapshot of the sequence counter, and at various times compare the expression above to the current value of the sequence counter to see if current value is equal to or greater than the expression. In current versions of the Linux® kernel, the snapshotting of the counter and the computation of the expression is carried out by the rcu_exp_gp_seq_snap( ) function, and the comparison is carried out by the rcu_exp_gp_seq_done( ) function. If the sequence counter has advanced to or beyond the value specified by the expression, a concurrent expedited RCU grace-period computation has satisfied the current request.

FIG. 5 illustrates that the rcu_state structure 52 may include fields 52A and 52B. The field 52A represents the current value of the expedited grace period sequence counter. The field 52B stores a value based on an initial snapshot of the sequence counter. This value may be the actual initial sequence counter value. Alternatively, it may be a value derived from the initial sequence counter value, such as by invoking the rcu_exp_gp_seq_snap( ) function to compute (s+3) & (~0x1). For convenience, the field 52A will be referred to as the expedited G.P. sequence counter and the field 52B will be referred to as the expedited G.P. sequence counter snapshot.

An additional field of the rcu_state structure 52 is the expedited G.P. help indicator 52C. This field is a flag that is set by the normal RCU grace period processing component 34A if an intervening expedited RCU grace period ends a normal RCU grace period. As noted above, the determination that an intervening expedited RCU grace period has elapsed will end a normal RCU grace period. Specifically, the normal RCU grace period processing component 34A will skip further force-quiescent-state scanning and instead proceed directly to grace-period cleanup. This approach, however, may trigger assertions in the nature of warnings about the normal RCU grace period having been truncated due to an error condition. In particular, some of the rcu_node structures 54 may have –>qsmask fields that are not fully cleared or may have –gp_tasks fields that are not empty. Both conditions are inconsistent with the ending of a normal RCU grace period since they are indicative of one or more CPUs not having passed through a quiescent state.

One solution would be to suppress all such assertions. However, the assertions are valuable for locating bugs, so disabling them entirely may be problematic. An alternative solution is to disable them only in the case where an expedited RCU grace period has in fact helped a normal RCU grace period to complete. The expedited G.P. help indicator 52C is used for this purpose. As noted above, the indicator 52C is set when a normal RCU grace period ends due to an intervening expedited RCU grace period. The indicator 52C may then be checked during normal RCU grace period cleanup operations. If the indicator 52C is set, the above-described assertions may be suppressed and the state of the rcu_node structures may be updated. This may include clearing out the –>qsmask fields and NULLing out the –>gp_tasks fields before starting initialization for the next normal RCU grace period. If the indicator 52C is not set, meaning that the normal RCU grace period did not end as a result of an intervening expedited RCU grace period, the assertion capability will remain in place.

In current versions of the Linux® kernel, there is a normal three-jiffy (i.e., three scheduling-clock-interrupt periods) wait between each force-quiescent-state pass performed during normal RCU grace period processing. If the expedited RCU grace period state check only occurs during successive force-quiescent-state passes, it is possible that a full three-jiffies could elapse between an expedited RCU grace period completing and the determining operation detecting this condition. In an embodiment, greater grace period latency benefits may be achieved by having the expedited RCU grace period processing component 34B periodically awaken the kernel thread (e.g. Linux® kthread) that implements the normal RCU grace period processing component 34A.

However, this is not without consequence. Segmentation faults will occur if the grace period kernel thread has not yet been created. The wakeups must therefore be conditioned on the existence of this thread. Reduced RCU grace-period latency may also increase overhead per unit time. On a system with a high rate of expedited RCU grace periods, the overhead of normal RCU grace periods could be increased by orders of magnitude. Wakeups may therefore be spaced sufficiently to avoid excessive overhead. One way of doing this is to refrain from waking up the normal RCU grace period kernel thread more frequently than a predetermined time interval. For example, wakeups could restricted to once per ten scheduling-clock-interrupt periods (i.e., ten jiffies in the Linux® kernel) or no more frequently than every fourth RCU grace period. The numbers ten and four are mentioned by way of example only, and may be changed as required for a given installation or workload.

It should also be appreciated that if the system 2 is mostly idle, the CPU overhead of frequent wakeup "helping" might not be a big concern. In an embodiment, wakeup throttling may be conditioned on the system CPU utilization being higher than a certain level, for example, greater than 20%. CPU utilization may be determined in any suitable manner. One approach would be to determine the fraction of time that each CPU is non-idle. Per-CPU measurements may be combined, for example, by averaging the measurements from all CPUs. Alternatively, on systems where division is expensive, the per-CPU measurements may be summed and compared to a cut-off value that may be computed (e.g., at boot time) based on the number of CPUs in the system. On systems that support CPU hotplugging, the cut-off value may be recomputed during each CPU-hotplug operation so as to reflect the actual number online CPUs.

CPU utilization may be updated periodically, such as every millisecond (so once per scheduling clock tick in the default HZ=1000 configuration of the Linux® kernel) to reduce the overhead of measuring it. In addition, this measurement could be digitally filtered to avoid flip-flopping between helping (i.e., kthread waking up) or not. By way of example only, the digital filter of equation (1) below could be employed to give weight to historical estimates.

$$\text{new\_util\_est} = \frac{1}{16} * [15 * \text{new\_util\_est} + \text{current\_measurement}] \quad (1)$$

In equation (1), the variable new_util_est on the left side of the equation represents a new CPU utilization estimate to be calculated. The variable new_util_est on the right side of the equation is the existing CPU utilization measurement. This variable may be initialized (e.g., at system startup) by setting it to zero, or to its value from a previous system boot, or to a value set by a system administrator. The variable current_measurement is a short-term (or even instantaneous) measure of CPU utilization. For example, on systems with a per-CPU periodic scheduling-clock interrupt, current_measurement may be 0 if the idle state was interrupted and 1 (100%) otherwise. It will be appreciated from equation (1)

that if current_measurement is 0 for some number of measurements, new_util_est will gradually fall toward 0. Conversely, if current_measurement is 1 for some number of measurements, new_util_est will gradually drift upwardly toward 1. Note that the factor "15" in equation (1) may be increased to emphasize history more, or it can be decreased to make the estimate more responsive to changes in CPU utilization.

Given that operating system kernels normally cannot use floating-point arithmetic, the current_measurement values may be scaled. For example, on a 32-bit system, the value current_measurement=0x7fffff could be used in place of 1 if a non-idle state was interrupted. If the CPU was interrupted from idle, the value current_measurement=0 may be used. Note that this assumes a 32-bit system has no more than 256 CPUs. Greater numbers of CPUs can result in signed integer overflow. Similar constants may be constructed for 64-bit systems. For example, the value current_measurement=0x7fffffffff in place of 1 if a non-idle state was interrupted would allow a 64-bit system to have up to 1,048,576 CPUs while allowing ample accuracy.

Figure 6:
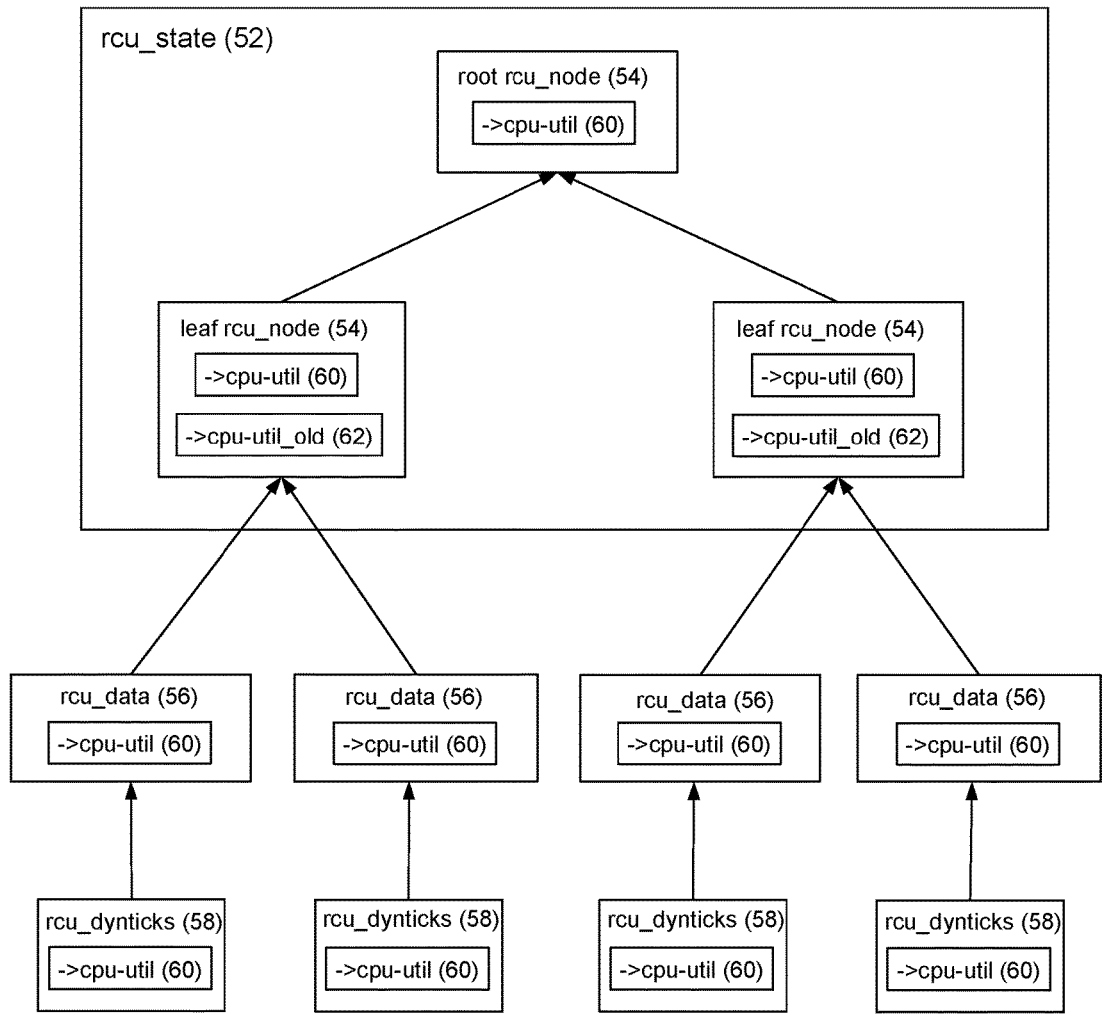
FIG. 6 is a functional block diagram showing an example RCU combining tree.

In an embodiment, the rate of update could be inversely related to the number of CPUs in order to maintain a constant level of memory contention on the new_util_est variable of equation (1). Alternatively, the new_util_est variable could be computed using a hierarchical approach. One way to do this would be to use the combining tree provided by the rcu_state structure 52 of FIG. 5. Such an embodiment could be implemented in various ways. For example, as shown in FIG. 6, each rcu_node structure 54 could contain a sum of measurements field 60 (which may be called –>cpu_util) as could each rcu_data structure 56 and each rcu_dynticks structure 58. Each non-root rcu_node structure could also contain a second sum of measurements field 62 (which may be called –>cpu_util_old). All these fields may be initially set to 0. As CPUs perform CPU utilization measurements, they may update the –>cpu_util field 60 of their rcu_dynticks structures 56. The CPU's may report quiescent states to the rcu_node structures 54 in the usual manner, while also adding their CPU utilization measurements to the –>cpu_util field 60 of the rcu_node structures to which they report (as well as the –>cpu_util field of their rcu_data structures 56). Force-quiescent-state processing implemented by the RCU subsystem 20 may perform the updates on behalf of idle CPUs. The last CPU to report its quiescent state to a given rcu_node structure 54 may push the latter's CPU utilization estimate one level higher in the combining tree to the rcu_node structure's parent rcu_node structure. Eventually, the sum of the CPU utilization estimates for all online CPUs will be stored in the –>cpu_util field 60 of the root rcu_node structure 54.

Each time a new_util_est CPU utilization estimate is computed for a given CPU per equation (1), the value may be placed into the –>cpu_util field 60 of the rcu_dynticks structure 58 for that CPU. If a given CPU goes offline, it may set the –>cpu_util field of the CPU's rcu_dynticks structure 58 to 0. Any time a CPU accesses its leaf rcu_node structure 54 while holding that structure's –>lock, the CPU may compare the –>cpu_util fields 60 of its rcu_dynticks and rcu_data structures 56 and 58. If they are not equal, the CPU may set the leaf rcu_node structure's –>cpu_util_old field 62 to its –>cpu_util field 60, subtract (back out) the –>cpu_util field 60 of the rcu_data structure 56 from that of the rcu_node structure 54, add (insert) the –>cpu_util field 60 of the CPU's rcu_dynticks structure 58 into that of the rcu_node structure 54, and then set the –>cpu_util field 60 of the rcu_data structure to that of the rcu_dynticks structure. In this way, any changes in the CPU's utilization status will initiate adjustments to the –>cpu_util fields 60 of the combining tree.

Every time a CPU holds the –>lock of one rcu_node structure 54 and also that of the rcu_node structure's parent (i.e. it is the last CPU to report a quiescent state to the child rcu_node structure), the CPU may set the parent rcu_node structure's –>cpu_util_old field 62 to its –>cpu_util field 60, subtract the child rcu_node structure's –>rcu_util_old field 62 from the parent's –>cpu_util field 60, add the child rcu_node structure's –>cpu_util field 60 to that of the parent, and then set the child rcu_node structure's –>cpu_util_old field 62 to its –>cpu_util field 60. In this way, the sum of the CPU utilization values for all online CPUs will be propagated up the combining tree and stored in the –>cpu_util field 60 of the root rcu_node structure 54. This number may be divided by the number of online CPUs to determine an approximate system-wide CPU utilization.

Note that if a number of CPUs have recently gone offline, it is possible that the –>cpu_util field 60 of the root rcu_node structure 54 will reflect CPU utilization for a greater number of CPUs than there are online CPUs. An embodiment thus might choose to limit the CPU utilization value to the number of online CPUs. However, this may need to be done using a separate computation. The value of the root rcu_node structure's –>cpu_util field 60 itself need not be adjusted, as doing so could result in later underflow.

Ignoring the possibility of adjustment, each CPU-hotplug operation may compute a fraction of the number of CPUs. Assuming the aforementioned 20% cutoff, this computation could multiply the fractional number of CPUs by the 100% utilization value (such as 0x7 fffff for 32-bit systems) and divide by 5. This result would be compared to the –>cpu_util field 60 of the root rcu_node structure 54. If the result is the greater of the two values, CPU utilization is less than 20% and the expedited RCU grace period processing component 34B may thus be more aggressive about sending wakeups to the normal RCU grace period processing component 34A kthread to accelerate normal RCU grace periods, for example, by ignoring the throttling.

As previously noted, the RCU testing functionality provided by the RCU testing component 36 is commonly referred to as the "rcutorture" test suite in current versions of the Linux® kernel. Currently, approximately 25% to 50% of the rcutorture test suite's RCU grace periods are expedited RCU grace periods by default. This means there is a very high probability that any given normal RCU grace period will be assisted by an expedited RCU grace period, which in turn means that the rcutorture test suite has a correspondingly low probability of detecting a bug that stalls normal RCU grace periods in the absence of expedited RCU grace periods.

In an embodiment, expedited RCU grace periods may be suppressed during rcutorture testing by the RCU testing component 36. This will ensure that a desired number of normal RCU grace periods will complete without short-circuiting by expedited RCU grace periods to assist in detecting bugs in normal RCU grace period processing. The duration of the suppression can be long enough to provoke an RCU CPU stall warning. The overall effect of these changes is that a concurrent expedited RCU grace period will relieve a normal RCU grace period of the need to do the last (or last two, depending on timing) force-quiescent-state passes. In the case where the last force-quiescent-state pass is omitted, the result is a slight decrease in normal RCU grace period overhead, and in the case where the last two passes are omitted, the result is a somewhat greater decrease in normal RCU grace-period overhead along with a larger decrease in normal RCU grace-period latency.

Figure 7:
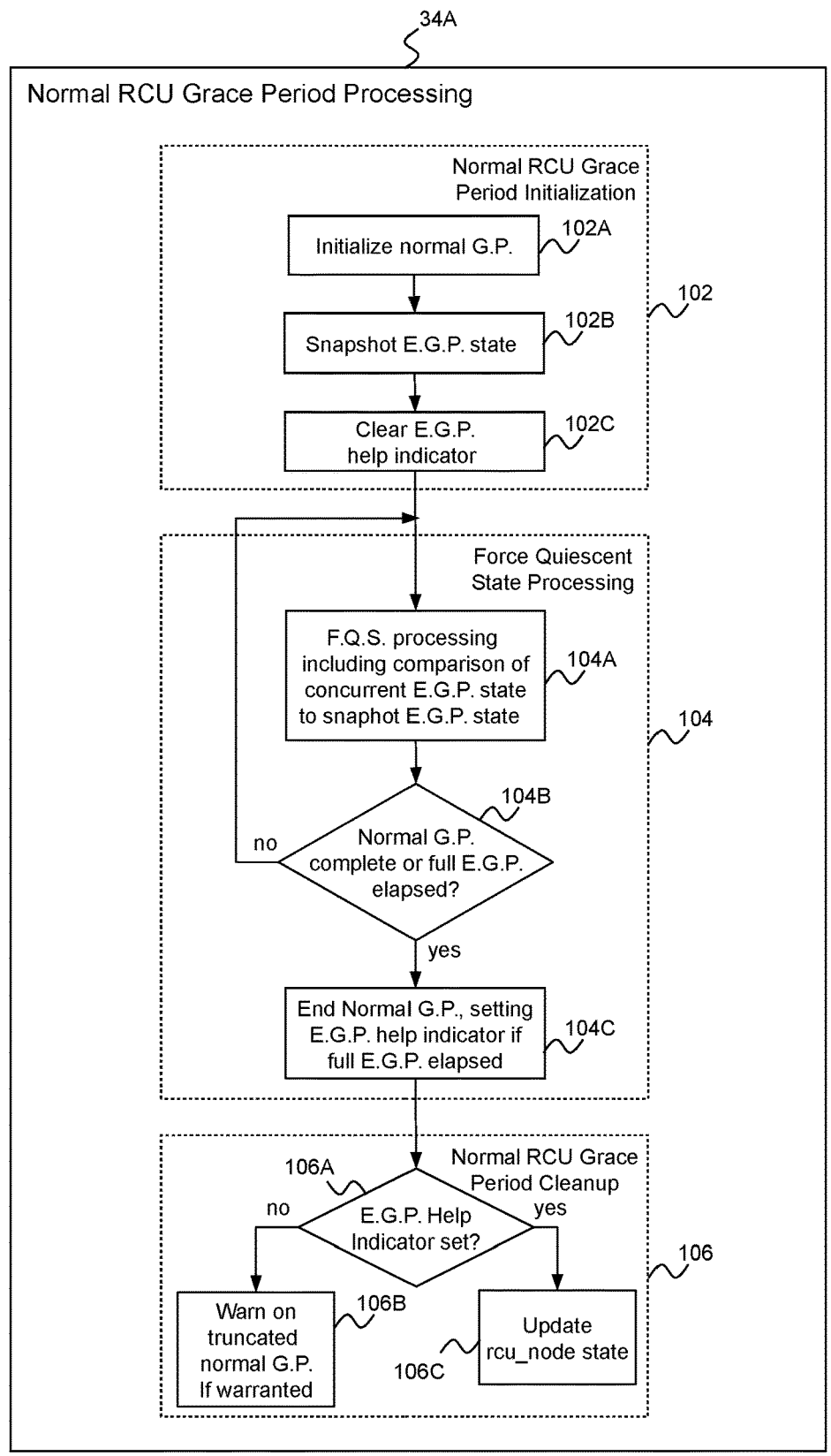
FIG. 7 is a flow diagram illustrating example normal RCU grace processing that may be short-circuited by an expedited RCU grace period that elapses during a normal RCU grace period.

Turning now to FIG. 7, example operations that may be performed by the normal RCU grace period processing component 34A to take advantage of intervening expedited RCU grace periods will now be described. In the embodiment of FIG. 7, the normal RCU grace period processing component 34A uses the existing three-phase methodology of current RCU Linux® kernel implementations, with appropriate modifications being made thereto in accordance with the present disclosure. The normal RCU grace period initialization phase is shown by reference number 102. The force-quiescent-state processing phase is shown by reference number 104. The normal RCU grace period cleanup phase is shown by reference number 106.

The normal grace period initialization phase 102 includes block 102A, which initializes a normal RCU grace period. Such processing may be performed in accordance with existing RCU implementations, such as those used in current versions of the Linux® kernel. Blocks 102B and 102C are new. Block 102B determines a current value of the expedited RCU grace period sequence counter 52A that represents an initial expedited RCU grace period state. In embodiment, the block 102B may use the existing exp_gp_seq_snap( ) function to not only determine the current value of the expedited RCU grace period sequence counter 52A, but also perform the computation (s+3) & ~0x1) and store the result in the expedited grace period sequence counter snapshot field 52B. Block 102C clears the expedited RCU grace period help indicator 52C for subsequent use during later stages of the normal RCU grace period processing.

It is desirable that the snapshotting of block 102B be performed following the completion of normal RCU grace period initialization in block 102A. Taking the snapshot earlier can result in a too-short normal RCU grace period, such as via the following hypothetical sequence of events:

1. CPU 0 implements block 102B of FIG. 7 to snapshot the expedited RCU grace period sequence counter 52A (such as by calling rcu_exp_gp_seq_snap( )). This occurs when CPU 0 is still in the process of initializing a normal RCU grace period in block 104A, such that this normal RCU grace period is only partially initialized.

2. CPU 1 carries out an expedited grace period, so that the later call to rcu_exp_gp_seq_done( ) will indicate completion.

3. CPU 2 starts a normal RCU read-side critical section, acquiring a reference to data element A of the shared data set 16 (see FIG. 4).

4. CPU 3 removes data element A from its data structure, and passes it to an RCU function such as kfree_rcu( ), which in turn schedules it to be freed after the end of the next normal RCU grace period. The state in the root rcu_node structure 54 looks like there is no normal RCU grace period in progress, so the wait will really be only to the end of the current partially-initialized normal RCU grace period.

5. CPU 0 completes block 102A of FIG. 7 so as to finish initializing the current normal RCU grace period. All future kfree_rcu( ) invocations will wait not for the current normal RCU grace period, but rather for the next one.

6. CPU 0 wakes up to perform force-quiescent-state processing in block 104 of FIG. 7, but notices that an expedited grace period has completed (due to CPU 1). CPU 0 therefore ends the current normal RCU grace period.

7. CPU 3 notices that the current normal grace period has ended, and therefore kfree( )s data element A. This is a problem because CPU 2 is still using data element A.

This sequence of events actually occurs in light of rcu-torture testing. Therefore, it is necessary to wait until a normal RCU grace period is completely initialized in block 102A before block 102B snapshots the expedited grace-period state.

The force quiescent state processing of block 104 includes block 104A, which may be invoked at the beginning of each force-quiescent-state pass. Block 104A ascertains whether an expedited RCU grace period has elapsed during the current normal RCU grace period. Assuming that block 102B used the rcu_exp_gp_seq_snap( ) function to compute the value stored in the expedited grace period sequence counter snapshot field 52B, block 104A may invoke the exp_gp_seq_done( ) function to compare the snapshot value against the current value of the expedited grace period quiescent state sequence counter 52A. Alternatively, if block 104B merely stored the actual initial sequence counter value in the expedited grace period sequence counter snapshot field 52B, block 104A may perform the (s+3) & (~0x1) computation itself and compare the result against the current sequence counter value.

Block 104B tests whether or not the current normal RCU grace period has ended of its own accord or due to an intervening expedited RCU grace period having elapsed. If neither event has occurred, processing returns to block 104A for another force-quiescent-state pass. If either event has occurred, block 104C ends the current normal RCU grace period, setting the expedited RCU grace period help indicator 52C if the normal RCU grace period ended as a result of an intervening expedited RCU grace period.

The normal RCU grace period cleanup processing of block 106 includes block 106A, which checks whether the expedited RCU grace period help indicator 52C has been set. If the expedited RCU grace period indicator 52 is not set, block 106B maintains the ability to provide the usual assertions that warn of a truncated normal RCU grace period when and if such assertions are warranted. If the expedited RCU grace period indicator 52 is set, block 106C updates the state of the rcu_node structures 54, as by clearing out the –>qsmask fields and NULLing out the –>gp_tasks fields, to ready the rcu_state structure for initialization of the next normal RCU grace period.

Figure 8:
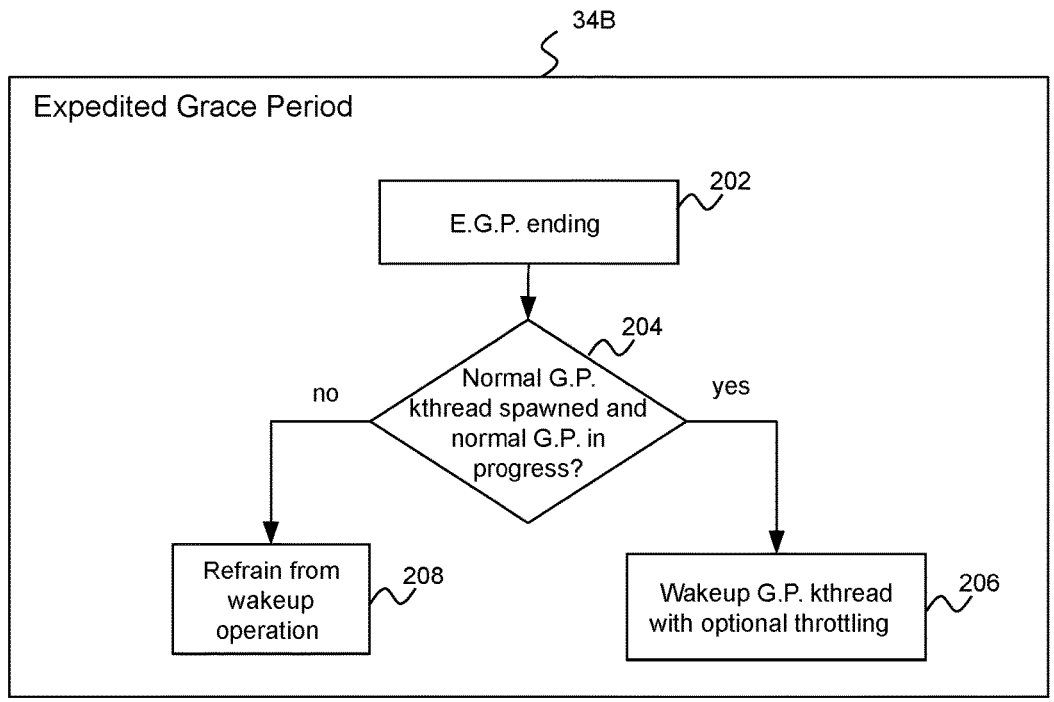
FIG. 8 is a flow diagram illustrating example expedited RCU grace period processing that includes waking up a kernel thread that implements normal RCU grace period processing.

Turning now to FIG. 8, example operations are shown that may be performed by the expedited RCU grace period processing component 34B to provide wakeups to the kernel thread that implements the normal RCU grace period processing component 34A. Block 202 represents the ending of an expedited RCU grace period as may be implemented by existing RCU implementations, such as those used in current versions of the Linux® kernel. Blocks 204, 206 and 208 are new. Block 204 checks whether a normal RCU grace period kernel thread has been spawned and is in progress. If not, block 208 refrains from performing an unwanted wakeup operation so as to avoid a segmentation fault. If a normal RCU grace period kernel thread has been spawned and is in progress, block 206 will wakeup this thread provided that sufficient time or grace periods have elapsed since the last wakeup. For example, as discussed above, wakeups could throttled to once per ten scheduling-clock-interrupt periods (i.e., ten jiffies in the Linux® kernel) or no more frequently than every fourth RCU grace period. Alternatively, wakeups could be conditionally throttled according to CPU utilization, as discussed above.

Figure 9A:
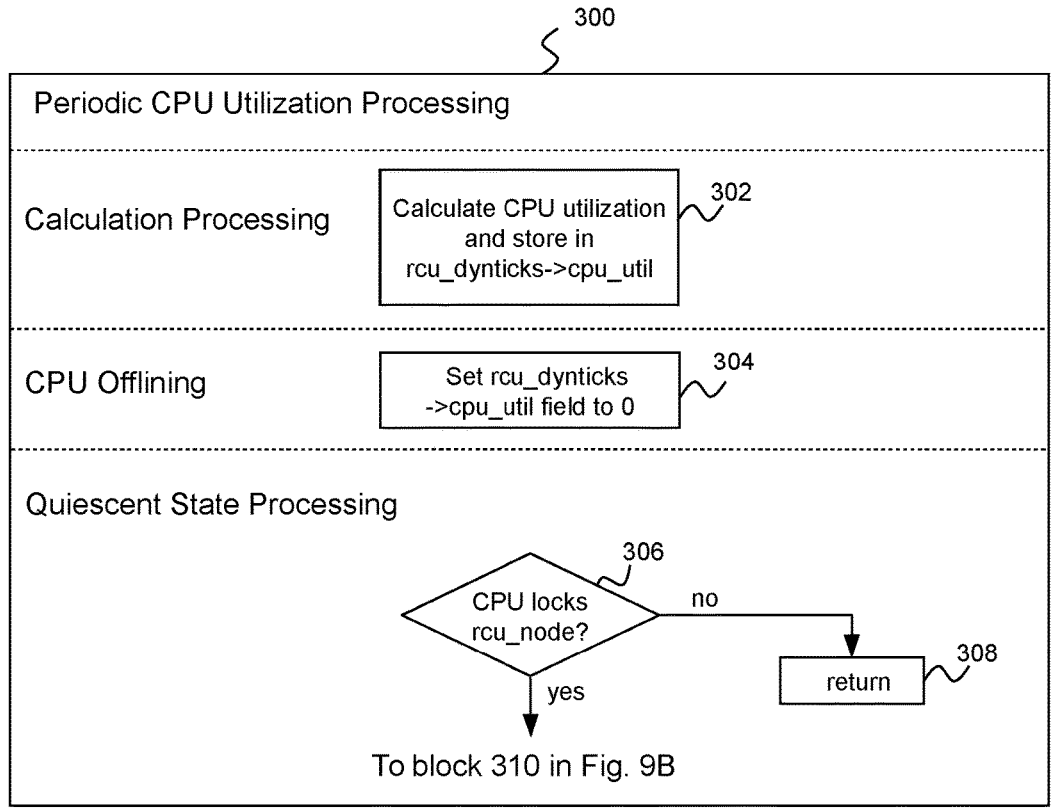
FIGS. 9A-9B is a flow diagram illustrating example periodic CPU utilization processing.
Figure 9B:
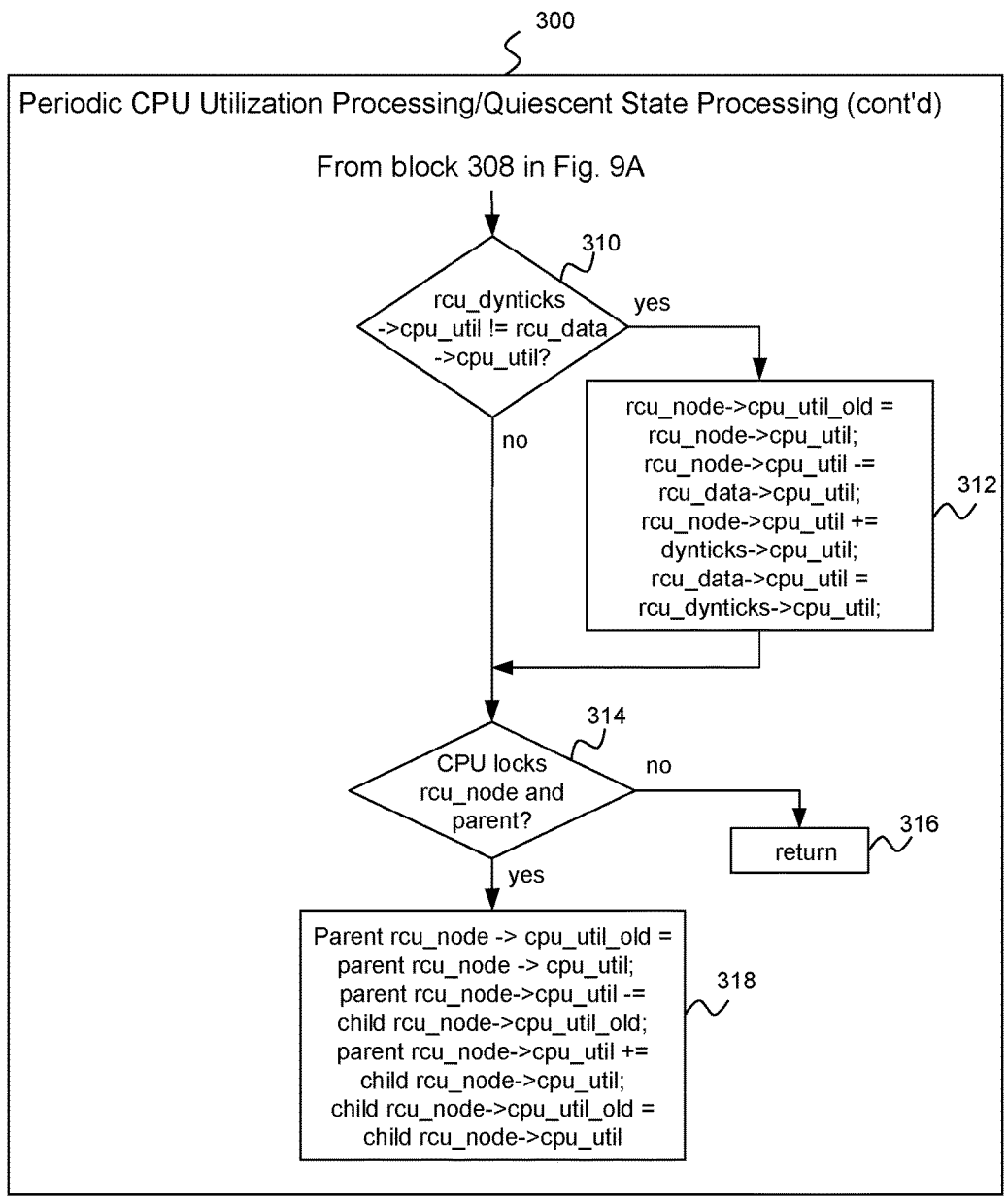

Turning now to FIGS. 9A-9B, example operations 300 are shown that may be periodically performed on a per-CPU basis to calculate CPU utilization using the combining tree of FIG. 6. As will be seen, the operations 300 may be invoked at different entry points depending on the caller context. For example, block 302 may be invoked in response to a scheduling clock interrupt event. Block 302 represents CPU utilization calculation processing wherein a CPU 4 (see FIG. 4) calculates its own CPU utilization. By way of example, the CPU could use equation (1) above to calculate new_util_est. The calculated CPU utilization is stored in the cpu_util field 60 of the CPU's rcu_dynticks structure 58.

Block 304 may be invoked in response to a CPU offlining event. If a CPU is going offline, block 304 sets the cpu_util field 60 of the CPU's rcu_dynticks structure to 0.

Blocks 306-320 may be invoked during RCU quiescent state processing. Block 306 checks whether a CPU has acquired the −>lock of its associated leaf rcu_node structure 54. If false, block 308 returns to the caller. If true, block 310 compares the −>cpu_util fields 60 of the CPU's rcu_dynticks and rcu_data structures 56 and 58. If block 310 determines they are not equal, block 312 sets the −>cpu_util_old field 62 of the CPU's rcu_node structure 54 to its −>cpu_util field 60, subtracts (backs out) the −>cpu_util field 60 of the rcu_data structure 56 from that of the leaf rcu_node structure 54, adds (inserts) the −>cpu_util field 60 of the CPU's rcu_dynticks structure 58 into that of the leaf rcu_node structure 54, and then sets the −>cpu_util field 60 of the rcu_data structure to that of the rcu_dynticks structure. If block 310 determines that the −>cpu_util fields 60 of the CPU's rcu_dynticks and rcu_data structures 56 and 58 are equal, no changes to the cpu_util field 60 of the CPU's leaf rcu_node structure 54 are required. It will be seen from blocks 310-312 that any changes in the CPU's utilization status will initiate adjustments to the −>cpu_util fields 60 of the combining tree. Moreover, insofar as a CPU going offline is considered a quiescent state, blocks 310-312 will typically be performed soon after block 304 executes, thus backing out the outgoing CPU's utilization from the −>cpu_util field 60 of the CPU's leaf rcu_node structure 54. As will now be discussed, blocks 314-318 propagate these changes up the combining tree hierarchy to the root rcu_node structure 54.

Block 314 checks whether a CPU holds −>lock of one rcu_node structure 54 and also that of the rcu_node structure's parent. If false, block 316 returns. If true, block 318 sets the parent rcu_node structure's −>cpu_util_old field 62 to its −>cpu_util field 60, subtracts the child rcu_node structure's −>rcu_util_old field 62 from the parent's −>cpu_util field 60, adds the child rcu_node structure's −>cpu_util field 60 to that of the parent, and then sets the child rcu_node structure's −>cpu_util_old field 62 to its −>cpu_util field 60. As the operations of blocks 314-318 are periodically performed, the CPU utilization values of online CPUs will be propagated up the combining tree from the leaf rcu_node structures 54 to the root rcu_node structure. When the last quiescent-state-reporting CPU performs the operations of block 316-320, the −>cpu_util field 60 of the root rcu_node structure 54 will store the sum of the CPU utilization values for all online CPUs. As previously noted, this number may be divided by the number of online CPUs to determine an approximate system-wide CPU utilization.

Accordingly, a technique for short-circuiting normal read-copy update (RCU) grace period computations in the presence of expedited RCU grace periods has been disclosed. It will be appreciated that the foregoing concepts may be variously embodied in any of a data processing system, a machine implemented method, and a computer program product in which programming logic is provided by one or more computer readable data storage media for use in controlling a data processing system to perform the required functions. Example embodiments of a machine-implemented method and data processing system were previously described in connection with FIGS. 4-9.

With respect to a computer program product, digitally encoded program instructions may be stored on one or more computer readable data storage media for use in controlling a computer or other information handling machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to, C, C++, assembly, to name but a few. When implemented on a machine comprising a processor, the program instructions combine with the processor to provide a particular machine that operates analogously to specific logic circuits, which themselves could be used to implement the disclosed subject matter.

Figure 10:
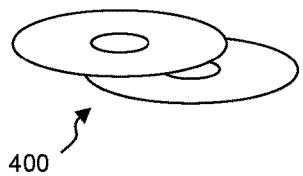
FIG. 10 is a diagrammatic illustration showing example computer readable data storage media that may be used to provide a computer program product in accordance with the present disclosure.

Example computer readable data storage media for storing such program instructions are shown by reference numerals 8 (memory) and 10 (cache) of the computer system 2 of FIG. 4. The computer system 2 may further include one or more secondary (or tertiary) storage devices (not shown) that could store the program instructions between system reboots. The computer system 2 could also store information on one or more remote servers (not shown), which would also include a computer readable storage medium for storing program instructions as described herein. A further example of a computer readable data storage medium that may be used to store the program instructions would be portable optical storage disks of the type that are conventionally used for commercial software sales, such as compact disk-read only memory (CD-ROM) disks, compact disk-read/write (CD-R/W) disks, and digital versatile disks (DVDs). Examples of such media are shown by reference number 400 in FIG. 10.

The computer readable storage medium can thus be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program code described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program code from the network and forwards the computer readable program code for storage in a computer readable storage medium within the respective computing/processing device.

Computer readable program code for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). As previously mentioned, in some embodiments, electronic circuitry including, for example, programmable logic circuitry, field-programmable gate arrays (FPGA), or programmable logic arrays (PLA) may execute the computer readable program code by utilizing state information of the computer readable program code to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program code.

The computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program code may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program code may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A method for short-circuiting normal read-copy update (RCU) grace period computations in the presence of expedited RCU grace periods, said method comprising: determining during normal RCU grace period processing whether at least one expedited RCU grace period has elapsed during a normal RCU grace period;
   if at least one expedited RCU grace period has elapsed during said normal RCU grace period, ending said normal RCU grace period;
   if at least one expedited RCU grace period has not elapsed during said normal RCU grace period, continuing said normal RCU grace period processing;
   said expedited RCU grace periods being implemented by expedited RCU grace period processing that periodically awakens a kernel thread that implements said normal RCU grace period processing;
   said expedited RCU grace period processing conditionally throttling wakeups to said kernel thread based on CPU utilization.

2. The method of claim 1, wherein said conditional throttling is conditioned on said CPU utilization reaching a predetermined level.

3. The method of claim 2, wherein said CPU utilization is periodically updated using a CPU utilization calculation that includes filtering to avoid rapid cycling between throttling and not throttling.

4. The method of claim 3, wherein said filtering weights historical CPU utilization calculations.

5. The method of claim 1, wherein said CPU utilization is periodically calculated at a rate that is inversely proportional to a number of CPUs.

6. The method of claim 1, wherein said CPU utilization is calculated using a combining tree, and wherein individual CPUs report per-CPU utilization to leaf nodes of said combining tree and said per-CPU utilizations are propagated to a root node of said combining tree.

7. The method of claim 1, wherein said CPU utilization represents a fraction of time that a CPU is non-idle and comprises a value between 0-100%, with 100% CPU utilization being represented by a scaled value that can be divided using integer division to determine rates of CPU utilization that are less than 100%.

* * * * *